(12) United States Patent
Dryfoos et al.

(10) Patent No.: US 8,949,868 B2
(45) Date of Patent: Feb. 3, 2015

(54) METHODS, SYSTEMS AND COMPUTER PROGRAM PRODUCTS FOR DYNAMIC LINKAGE

(75) Inventors: Robert O. Dryfoos, Hopewell Junction, NY (US); Dennis Fallon, Sharon, CT (US); Colette A. Manoni, Brewster, NY (US); Mark Spies, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1364 days.

(21) Appl. No.: 11/456,283

(22) Filed: Jul. 10, 2006

(65) Prior Publication Data
US 2008/0127235 A1 May 29, 2008

(51) Int. Cl.
- *G06F 3/00* (2006.01)
- *G06F 9/44* (2006.01)
- *G06F 9/46* (2006.01)
- *G06F 13/00* (2006.01)
- *G06F 9/445* (2006.01)

(52) U.S. Cl.
CPC ................................ *G06F 9/44521* (2013.01)
USPC ........................................................ 719/331

(58) Field of Classification Search
USPC ........................................................ 719/331
See application file for complete search history.

(56) References Cited

U.S. PATENT DOCUMENTS

| | | | | |
|---|---|---|---|---|
| 5,361,337 A * | 11/1994 | Okin | ............................ | 712/228 |
| 5,375,241 A * | 12/1994 | Walsh | ........................... | 719/331 |
| 5,835,749 A * | 11/1998 | Cobb | ............................. | 719/331 |
| 6,292,843 B1 * | 9/2001 | Romano | ...................... | 719/331 |
| 6,698,015 B1 * | 2/2004 | Moberg et al. | ................ | 717/154 |

OTHER PUBLICATIONS

Ho, W. Wilson, "An Approach to Genuine Dynamic Linking", 1990, pp. 1-28.*

* cited by examiner

*Primary Examiner* — H S Sough
*Assistant Examiner* — Timothy A Mudrick
(74) *Attorney, Agent, or Firm* — Cantor Colburn LLP; Ingrid Foerster

(57) ABSTRACT

A method of dynamic linkage including: receiving a request to launch a program; checking a system memory for the program; reserving a unique memory block of the system memory for the program and loading the program into the unique memory block if the program is not found in the memory of the system; performing internal memory relocations for the program if the program is not found in the memory of the system; ensuring that a library required by the program has been loaded into the system memory if the program is not found in the memory of the system; and invoking the program.

11 Claims, 2 Drawing Sheets

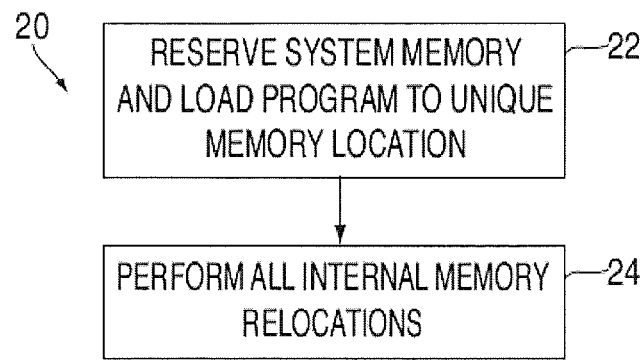
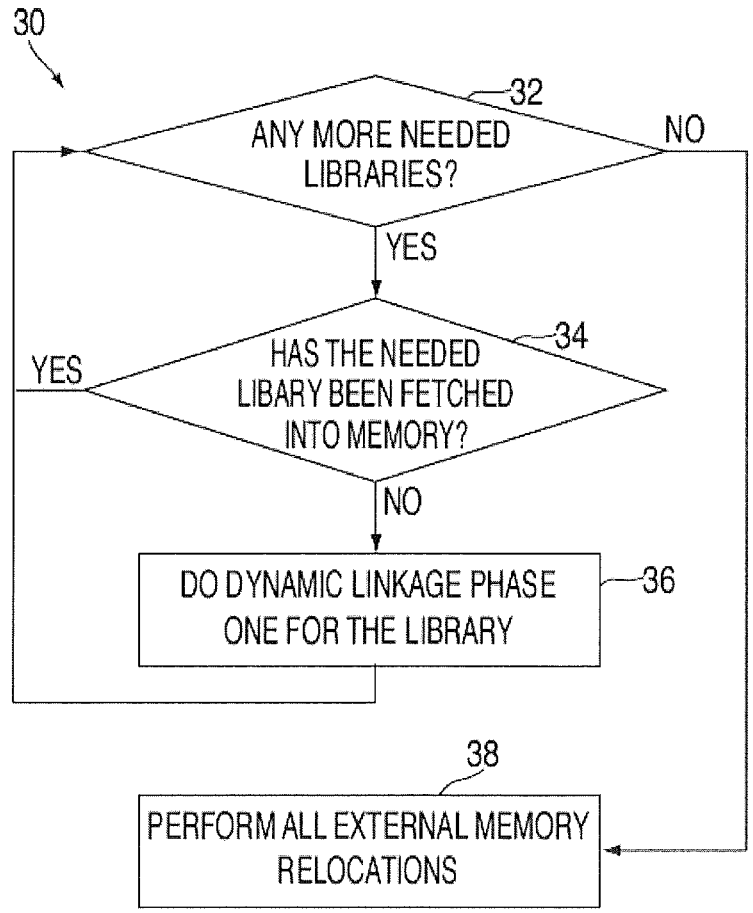

METHODS, SYSTEMS AND COMPUTER PROGRAM PRODUCTS FOR DYNAMIC LINKAGE

BACKGROUND

The present disclosure relates to processing in a computer system; more specifically the present disclosure relates to a method and system for dynamic linkage.

Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run an operating system, and under the control of the operating system, a user may execute an application program, such as a word processor. As the capabilities of computers have increased, the application programs designed for high performance computer systems have become extremely powerful.

Standard libraries consist of commonly used functions that are not provided directly in the programming language. Nearly all programs use various functions from standard libraries. Functions from these standard libraries can be incorporated into executables in one of two ways either, statically or dynamically. In the static method, the functions are loaded into memory as part of the executable program. In the dynamic method, the functions are part of a separate executable that is loaded into memory at the same time the program is loaded or when they are actually called. One drawback of static linkage is that it wastes space. For example, if there 200 executable programs, there will be 200 copies of the standard library routines because a copy is included in each of the programs. However in dynamic linkage, all the programs that use it share one copy of the standard library. Each program that uses a standard library contains a reference to it. When the program is loaded into memory to run, the loader uses the reference information to find the standard library and loads it as well. While dynamic linkage saves space, it provides a slower start up time than statically linked programs because programs usually reference a number of different libraries which all must be processed before the program can run.

Currently in the LINUX environment, dynamic linkage is done on a per-process basis. Each process calls a main application, which in turn can call functions or reference data in other libraries (shared objects). The main application is executed by a process and is loaded to a fixed virtual address. All run-time libraries needed by the application are loaded to variable addresses within the process' virtual address space. These other libraries (shared objects) may need to be read into memory from file or may already be in memory. In either case, once in memory, the shared objects need to be mapped to the process' virtual address space. All absolute addresses within the shared object reside in a "data segment" or writable segment, which makes use of the "copy-on-write" function to create a unique copy in memory for the current process. These absolute addresses need to be relocated to the new virtual address for this process and this needs to occur for all shared objects needed by the application (and recursively for all shared objects needed by the shared objects). In addition, the references to the shared objects need to be resolved within the called application.

Process creation overhead has been reduced through the use of a process known as "lazy binding". Lazy binding enables code to be executed without full resolving all external function calls. Instead, at runtime, a function call can result in a call directed to the operating system to perform relocation as necessary. If a program contains many calls to functions that are not used during a typical execution of the program, then lazy binding can save some unnecessary lookups. If anything, this attempt to reduce process creation overhead illustrates the fact that process creation overhead using this model is high.

Therefore what is needed is a method of dynamic linkage that reduces process creation overhead and therefore has a faster start up time than existing dynamic linkage methods.

SUMMARY

Exemplary embodiments include a method of dynamic linkage including: receiving a request to launch a program; checking a system memory for the program; reserving a unique memory block of the system memory for the program and loading the program into the unique memory block if the program is not found in the memory of the system; performing internal memory relocations for the program if the program is not found in the memory of the system; performing external relocations; ensuring that a library required by the program has been loaded into the system memory if the program is not found in the memory of the system; and invoking the program.

Exemplary embodiments also include a computer program product for providing dynamic linkage, the computer program product including: a storage medium readable by a processing circuit and storing instructions for execution by the processing circuit for facilitating a method including: receiving a request to launch a program; checking a system memory for the program; reserving a unique memory block of the system memory for the program and loading the program into the unique memory block if the program is not found in the memory of the system; performing internal memory relocations for the program if the program is not found in the memory of the system; performing external relocations; ensuring that a library required by the program has been loaded into the system memory if the program is not found in the memory of the system; and invoking the program.

Further exemplary embodiments include a dynamic linkage system including: means for receiving a request to launch a program; means for checking a system memory for the program; means for reserving a unique memory block of the system memory for the program and loading the program into the unique memory block if the program is not found in the memory of the system; means for performing internal memory relocations for the program if the program is not found in the memory of the system; means for ensuring that a library required by the program has been loaded into the system memory if the program is not found in the memory of the system; means for performing external relocations; and means for invoking the program.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Referring to the exemplary drawings wherein like elements are numbered alike in the several Figures:

FIG. 2 illustrates a flow chart of a portion of a method of dynamic linkage in accordance with exemplary embodiments; and FIG. 3 illustrates a flow chart of another portion of a method of dynamic linkage in accordance with exemplary embodiments.

DETAILED DESCRIPTION

Figure 1:
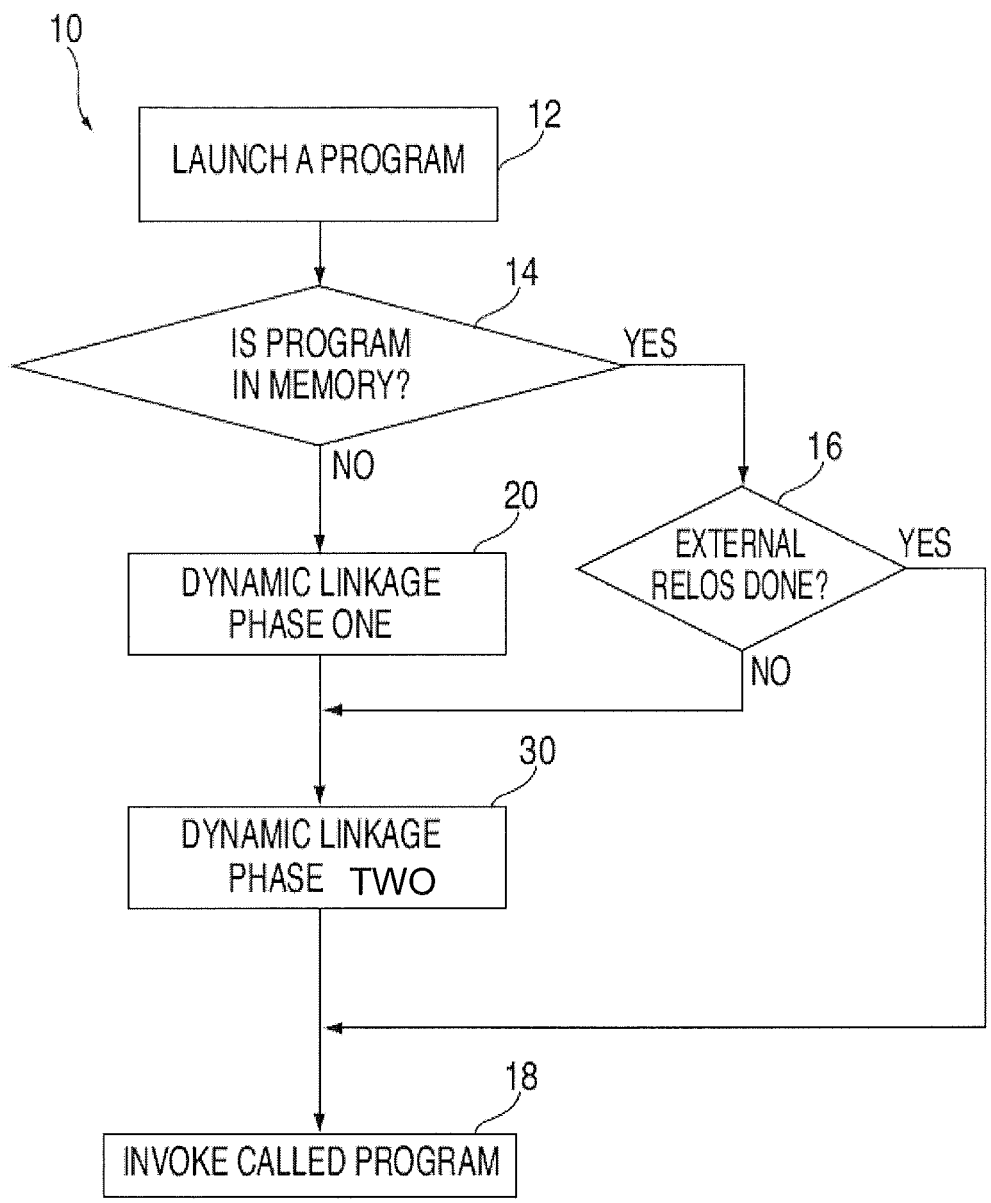
FIG. 1 illustrates a flow chart of a method of dynamic linkage in accordance with exemplary embodiments.

Exemplary embodiments include a method of dynamic linkage including: receiving a request to launch a program; checking a system memory for the program; reserving a unique memory block of the system memory for the program and loading the program into the unique memory block if the program is not found in the memory of the system; performing internal memory relocations for the program if the program is not found in the memory of the system; ensuring that a library required by the program has been loaded into the system memory if the program is not found in the memory of the system; performing external memory relocations if not previously performed; and invoking the program. Before a program can be invoked it must go through both internal memory relocations and external memory relocations. Libraries required by the program must also have internal relocations performed as part of loading into system memory, which actually occurs prior to processing external relocations for the program being invoked. However, external relocations are not performed at this time for any such required libraries.

In an exemplary embodiment of a computer system utilizing dynamic linkage, all programs are designed to be position-independent, meaning that the programs can be loaded anywhere in the system memory. Since the programs may be loaded anywhere in memory, all programs should have a uniquely qualified name from the system view to avoid confusion and processing errors. Furthermore, all programs are read into unique memory locations and all processes have a view of all programs.

In an exemplary embodiment of the system utilizing dynamic linkage, programs are prepared for execution using a two-phase process. During the first phase, if a program that is going to be executed is not already loaded in memory, sufficient memory is reserved for the program from the system. The program is then read into a unique memory location and all internal relocations are then resolved. The second phase of the process is to resolve all external references after making sure that all needed libraries have been loaded into memory. Loading needed libraries into memory entails going through the first phase (resolving internal relocations) only; the second phase of dynamic linkage is deferred until the first attempt to invoke the required library. During an initial program load, as applications are executed for the first time, the libraries needed by a particular application may have been read into memory by one of the early processes. A queuing mechanism can be used for processes trying to call a program that has not been fully prepared for execution. The system for dynamic linkage obviates the need for additional protection against recursion or circular dependencies, which simplifies the process of loading a system and reading thousands of interdependent programs into memory.

Referring now to FIG. 1, a flow chart depicting an exemplary embodiment of a dynamic linkage process is shown generally as 10. The first step in the dynamic linkage process is to launch a program, as shown at process step 12. Once a program has been launched, the system will check to see if the program has already been loaded into the system memory, as shown at process step 14. If the program has already been loaded into memory the process will check to determine if all required external libraries have been loaded into memory, as shown at process step 16. If all required external libraries have been loaded into memory the process proceeds to process step 18, where the program in invoked. If at process step 14, it is determined that the program has not been loaded into the system memory, the process proceeds to the first phase of the dynamic linkage process, as shown at process step 20. The first phase of the dynamic linkage process is discussed herein in further detail with reference to FIG. 2. Upon completion of the first phase of the dynamic linkage process 20 or upon determination that all required external libraries have not been loaded into memory at process step 16, the process proceeds to the second phase of the dynamic linkage process, as shown at process step 30. The second phase of the dynamic linkage process is discussed herein in further detail with reference to FIG. 3.

Turning now to FIG. 2, the first phase of the dynamic linkage process is generally depicted as 20. The first step in the first phase of the dynamic linkage process is to reserve system memory and load the program to the unique memory location, as shown at process step 22. The next step in the process, as shown at process step 24, is to perform all internal memory relocations for the program.

Referring now to FIG. 3, the second phase of the dynamic linkage process is generally depicted as 30. The first step of the second phase of the dynamic linkage process is to check to see if the program has more needed libraries, as shown at process step 32. If the program does not have more needed libraries the second phase of the dynamic linkage process proceeds to process step 38. Otherwise, the process proceeds to process step 34 where it is determined if the needed library has been loaded into memory. If it is determined that the needed library has been loaded into memory, the process returns to process step 32. Otherwise, the process proceeds to process step 36, where the needed library is loaded into memory using the first phase of the dynamic linkage process 20. At process step 38, all external memory relocations are preformed and the second phase of the dynamic linkage process concludes.

In an exemplary embodiment of the system for dynamic linkage, all inter-program calls go through an operating system intercept which performs several functions including, but not limited to, function call tracing. The operating intercept may take the form of a table of intercepts that is built dynamically by the system, as application programs are loaded or registered. The intercept code can therefore be tailored to the type of program being called, for maximum efficiency, and the contents of the intercept for each program are based on the state of the program. After a program has finished the first and second phases of the dynamic linkage process the operating system intercept changes a service routine address in the program stub code, or intercept code. In one embodiment, the program stub code, or intercept code, combined with the common operating system code make up the operating system intercept. During the normal runtime linkage any inter-program operating system functions are executed and the target program is executed.

The program stub code can reside anywhere in memory separate from the program itself Instead of runtime dynamic linkage checking to see whether or not a program has been through dynamic linkage phase one, the service routine address in the program stub routine could have separate entry points for dynamic linkage phase one and dynamic linkage phase two. Since dynamic linkage occurs only once per program per IPL so there is no benefit to a separate state indicator. The address is changed from dynamic linkage to "normal runtime" only once, but that change avoids additional checking on every subsequent invocation to the program until the next IPL.

It is desirable to initial program load a system and perform setup operations as quickly as possible to minimize system outages and start dispatching processes to handle transactions as soon as possible. A transaction processing installation may have any number of "only-if-needed" application programs loaded on file and ready to be run if necessary, but it is preferable to keep these programs on file (and not in memory) unless needed. During an initial program load applications are executed for the first time, the libraries needed by a particular application may have been read into memory by one of the early processes. In an exemplary system during the life of an initial program launch all references will eventually need to be resolved. Accordingly, the per-program cost associated with this arrangement is once per initial program launch. Since all internal relocations are handled when the program is read from the file into memory and all external references are resolved, lazy binding would not reduce overhead.

In exemplary embodiments the system for dynamic binding includes an operating system intercept. When a process invokes an application by its unique name, the operating system intercept is given control, as with any inter-program call. The operating system intercept determines the state of the called program and takes action determined by the program state. In exemplary embodiments the called program may be in one of four possible states including: not loaded into memory; being loaded into memory; having external references resolved; and loaded into memory.

If the operating system intercept determines that the program is in the not yet loaded into memory state, the operating system intercept executes the first phase of the dynamic linkage process and places the calling process in a queue awaiting completion of the dynamic linkage process. If the operating system intercept determines that the program is in the being loaded into memory state, the operating system intercept places the calling process in a queue awaiting completion of the dynamic linkage process. If the operating system intercept determines that the program is in the having external references resolved state, the operating system intercept places the calling process in a queue awaiting completion of the dynamic linkage process. If the operating system intercept determines that the program is in the loaded into memory state, the operating system intercept invokes the called program.

After completion of both phases of the dynamic linkage process the program is successfully loaded into memory and the called program is invoked and utilized by the programs in the queue. The first phase of the dynamic linkage process includes obtaining memory for the called program, reading the called program from file into memory, and performing internal memory relocations. The second phase of the dynamic linkage process includes ensuring that each needed library has been read into memory and performing resolution of external references. For typical inter-program calls, the operating system intercept will never see the called program in the "not yet linked" or "phase 1 in progress" states. The reason is that before the calling program can be executed, it will have gone through the second phase of the dynamic linkage process, which means that all needed libraries have gone through the first phase of the dynamic linkage phase process.

In an exemplary embodiment, the system for dynamic linkage also supports application-to-application calls where the called application is not a library function, but a program with an entry point, and such programs are not specified as "needed libraries" at link time. Since the calling program is going to go through an operating system intercept, and not directly to the called application, the external reference can be resolved without reading the called application into memory. Therefore, it is possible that the operating intercept will see the called application in not yet loaded into memory state for these types of linkages.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method of dynamic linkage comprising:
   receiving a request to launch a program from a calling process;
   checking a system memory for the program;
   reserving a unique memory block of the system memory for the program and loading the program into the unique memory block if the program is not found in the memory of the system;
   performing internal memory relocations for the program if the program is not found in the memory of the system;
   ensuring that a library required by the program has been loaded into the system memory if the program is not found in the memory of the system; and
   invoking the program;
   wherein invoking the program includes:
   an operating system intercept determining a state of the program and taking action in response to the state;

wherein if the operating system intercept determines that the program is in a not yet loaded into memory state, the operating system intercept executes a first phase of a dynamic linkage process and places the calling process in a queue awaiting completion of the dynamic linkage process;

wherein if the operating system intercept determines that the program is in a being loaded into memory state, the operating system intercept places the calling process in the queue awaiting completion of the dynamic linkage process;

if the operating system intercept determines that the program is in a having external references resolved state, the operating system intercept places the calling process in a queue awaiting completion of the dynamic linkage process; and if the operating system intercept determines that the program is in a loaded into memory state, the operating system intercept invokes the program.

2. The method of claim 1, wherein ensuring that a library required by the program has been loaded into the memory of the system comprises:
   checking the memory of the system for the library;
   reserving a second unique memory block for the library; and
   loading the library into the second unique memory block of the system memory if the library is not found in the memory of the system.

3. The method of claim 1 further comprising placing the calling process in a queue if the program is not found in the system memory.

4. The method of claim 3 further comprising removing the calling process from the queue once the program has been loaded into the system memory, internal memory relocations have been preformed, and the library required by the program has been loaded into system memory.

5. A computer program product for providing dynamic linkage, the computer program product comprising:
   a storage medium readable by a processing circuit and storing instructions for execution by the processing circuit for facilitating a method comprising:
   receiving a request to launch a program;
   checking a system memory for the program;
   reserving a unique memory block of the system memory for the program and loading the program into the unique memory block if the program is not found in the memory of the system;
   performing internal memory relocations for the program if the program is not found in the memory of the system;
   ensuring that a library required by the program has been loaded into the system memory if the program is not found in the memory of the system; and
   invoking the program;
   wherein invoking the program includes:
   an operating system intercept determining a state of the program and taking action in response to the state;
   wherein if the operating system intercept determines that the program is in a not yet loaded into memory state, the operating system intercept executes a first phase of a dynamic linkage process and places the calling process in a queue awaiting completion of the dynamic linkage process;
   wherein if the operating system intercept determines that the program is in a being loaded into memory state, the operating system intercept places the calling process in a queue awaiting completion of the dynamic linkage process;
   if the operating system intercept determines that the program is in a having external references resolved state, the operating system intercept places the calling process in the queue awaiting completion of the dynamic linkage process; and
   if the operating system intercept determines that the program is in a loaded into memory state, the operating system intercept invokes the program.

6. The computer program product of claim 5, wherein ensuring that a library required by the program has been loaded into the memory of the system comprises:
   checking the memory of the system for the library;
   reserving a second unique memory block for the library; and
   loading the library into the second unique memory block of the system memory if the library is not found in the memory of the system.

7. The computer program product of claim 5 further comprising placing the calling process in a queue if the program is not found in the system memory.

8. The computer program product of claim 7 further comprising removing the calling process from the queue once the program has been loaded into the system memory, internal memory relocations have been preformed, and the library required by the program has been loaded into system memory.

9. A dynamic linkage system comprising:
   means for receiving a request to launch a program;
   means for checking a system memory for the program;
   means for reserving a unique memory block of the system memory for the program and loading the program into the unique memory block if the program is not found in the memory of the system;
   means for performing internal memory relocations for the program if the program is not found in the memory of the system;
   means for ensuring that a library required by the program has been loaded into the system memory if the program is not found in the memory of the system; and
   means for invoking the program
   wherein the means for invoking the program includes:
   an operating system intercept determining a state of the program and taking action in response to the state;
   wherein if the operating system intercept determines that the program is in a not yet loaded into memory state, the operating system intercept executes a first phase of a dynamic linkage process and places the calling process in a queue awaiting completion of the dynamic linkage process;
   wherein if the operating system intercept determines that the program is in a being loaded into memory state, the operating system intercept places the calling process in a queue awaiting completion of the dynamic linkage process;
   if the operating system intercept determines that the program is in a having external references resolved state, the operating system intercept places the calling process in the queue awaiting completion of the dynamic linkage process; and
   if the operating system intercept determines that the program is in a loaded into memory state, the operating system intercept invokes the program.

10. The system of claim 9 further comprising means for placing the calling process in a queue if the program is not found in the system memory.

11. The system of claim 10 further comprising means for removing the calling process from the queue once the program has been loaded into the system memory, internal memory relocations have been preformed, and the library required by the program has been loaded into system memory.

\* \* \* \* \*